Feb. 4, 1969 E. H. FRIEDMANN ET AL 3,425,298

FLUID TORQUE TRANSMITTER

Filed Sept. 30, 1966 Sheet 1 of 2

Eric Helmuth Friedmann,
Timothy Richard Trembath,
Hendrik Cancrinus and
Philip John Fourie, Inventors
By Wenderoth, Lind and Ponack,
Attorneys Eric Helmuth Friedmann
Timothy Richard Trembath,
Hendrik Canerinus and
Philip John Fourie, Inventors
By, Wenderoth, Lind and Ponack, Attorneys United States Patent Office 3,425,298
Patented Feb. 4, 1969

1

3,425,298
FLUID TORQUE TRANSMITTER

Eric Helmuth Friedmann and Timothy Richard Trembath, Cape Town, Cape Province, Hendrik Cancrinus, Rondebosch, Cape Province, and Philip John Fourie, Tokai, Cape Province, Republic of South Africa, assignors to Inpower Works (Proprietary) Limited
Filed Sept. 30, 1966, Ser. No. 583,279
Claims priority, application Republic of South Africa, Oct. 1, 1965, 65/5,339
U.S. Cl. 74—752 10 Claims
Int. Cl. F16h 3/74, 57/10

ABSTRACT OF THE DISCLOSURE

A fluid torque transmitter which includes a carrier rotatable about its axis relative to a wheel co-axial therewith, planet wheels rotatably mounted on the carrier about axes eccentric to the carrier axis, and meshing with the driven wheel. Each planet wheel has liquid-entrapping means including liquid retainers spaced circumferentially about the planet wheel axis and a shroud fast with the carrier and disposed on the leading side of the liquid retainers relative to the direction of rotation of the carrier about its axis.

The present invention relates to a fluid torque transmitter.

According to the invention, a fluid torque transmitter includes a carrier adapted for receiving a rotary power input; at least one planet wheel rotatably mounted on the carrier; a driven wheel coaxial with the carrier and drivingly connected to the planet wheel and adapted for connection to a power output; liquid-entrapping means which includes a liquid-entrapping wheel having liquid retainers spaced circumferentially about the planet wheel axis and having axially directed openings defined between adjacent liquid retainers on at least one side of the liquid-entrapping wheel, the liquid-entrapping wheel being co-axial and fast with the planet wheel; a reservoir in the form of a drum around the liquid-entrapping means and co-axial with the carrier and adapted to contain hydraulic fluid, the liquid-entrapping means being arranged to entrap liquid from a peripheral layer of liquid set up in the drum due to the rotation of the carrier, and to displace such entrapped liquid inwardly towards the rotational axis of the carrier against the action of centrifugal force, the liquid-entrapping means including also shroud means fast with the carrier, the shroud means being adapted to seal off the axially directed openings between adjacent liquid retainers on that side of the liquid-entrapping wheel which leads the planet wheel axis relative to the direction of rotation of the carrier about its axis.

The liquid-entrapping wheel may have radially directed openings out of the recesses defined between adjacent liquid retainers, and the shroud means may also be arranged to seal off such radially directed openings on the leading side of the liquid-entrapping wheel.

The radially outward end of the shroud may be positioned to become submerged by the peripheral liquid layer formed in the drum under the action of centrifugal force when the carrier rotates.

The liquid retainers may be in the form of any one of the following:

Curved vanes extending from a central boss;
Straight vanes extending from a central boss;
Curved vanes circumferentially spaced apart; or
Straight vanes circumferentially spaced apart and disposed at an angle to the radii from the planet wheel axis.

2

The shroud means may be arcuately adjustable in position about the planet wheel axis.

The invention will now be described by way of example with reference to the accompanying diagrammatic drawings.

Figures 1, 2, 3, 14:
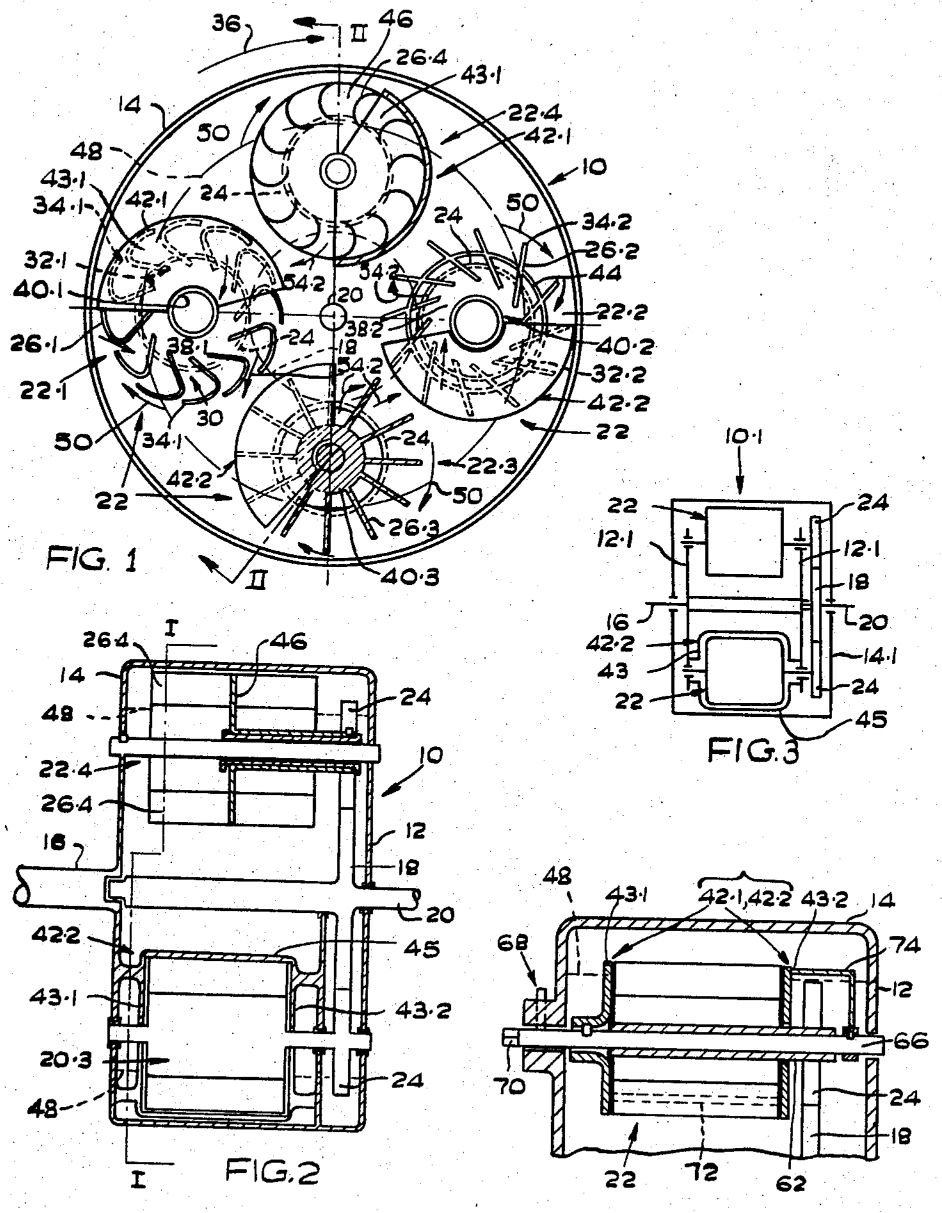
FIGURE 1 shows a cross-section at I—I of FIGURE 2 of a torque transmitter in the form of a fluid coupling.
FIGURE 2 shows an axial section at II—II in FIGURE 1.
FIGURE 3 shows an axial section of an embodiment of a torque transmitter in the form of a fluid coupling, and having a loose drum.
FIGURE 14 shows a part axial section of an arrangement for adjusting the shroud means of a coupling in accordance with the invention.

Referring to FIGURES 1 and 2, reference numeral 10 refers to a coupling comprising a carrier 12 integral with a reservoir in the form of a drum 14, an input shaft 16 fast with the carrier 12, and a driven wheel in the form of a sun wheel 18, co-axial with the carrier 12 and input shaft 16 and having an output shaft 20 fast with it. The coupling further comprises liquid-entrapping wheels, generally indicated reference numeral 22, mounted to rotate about axes spaced away from the carrier axis. These liquid-entrapping wheels are fast with toothed planet wheels 24 meshing with the sun wheel 18.

In order to save space, different liquid-entrapping wheels are shown in FIGURE 1. It will be understood, however, that in practice, if desired, a plurality of similar liquid-entrapping wheels will be arranged in dynamic balance about the carrier axis. Two types of shrouds are used with the various types of liquid-entrapping wheels. The first type of shroud, indicated generally by reference numeral 42.1, comprises merely a pair of end walls 43.1 and 43.2, without a wall 45 of arcuate section around the liquid-entrapping wheel extending between the said end walls. The second type of shroud, indicated generally by reference numeral 42.2, includes such a wall 45 of arcuate section extending axially between the said end walls.

The axially spaced end walls 43.1 and 43.2 of shroud 42.1 and shroud 42.2 are adapted to seal off axially directed openings out of recesses defined between adjacent vanes of liquid-entrapping wheels. The wall 45 of arcuate section is adapted to seal off radially directed openings defined between adjacent vanes of liquid-entrapping wheels. The shrouds 42.1 and 42.2 are fast with the carrier and are provided on the leading side of the planet wheel axis relative to the direction of rotation of the carrier about its axis.

The liquid-entrapping wheels may have vanes of different shapes, the vanes being generally indicated by reference numeral 26. Thus, in FIGURES 1 and 2, liquid retainer wheel 22.1 has liquid retainers in the form of circumferentially spaced, curved vanes 26.1 of substantially C-section which define recesses which are axially open to permit axial flow out of them. The vanes 26.1 are so disposed about the planet wheel axis that the openings 30 defined between their inner edges 32.1 and outer edges 34.1 at the outer periphery on the far side of the wheel axis relative to the carrier axis, are directed in the same direction as the direction of rotation of the carrier about its axis, as indicated by arrow 36. The vanes are embedded at their ends in axially spaced flanges 38.1 fast with a central boss 40.1. A clearance space is defined between the central boss 40.1 and the inner edges 32.1 of the vanes 26.1 to permit fluid flow through this space. A shroud 42.1 is provided with this type of liquid-entrapping wheel 22.1.

The liquid-entrapping wheel 22.2 of FIGURE 1 has straight vanes 26.2 held in circumferentially spaced relationship in axially spaced flanges 38.2 fast with a central boss 40.2. The vanes are straight but are disposed at an angle to radii from the planet wheel axis. Stiffening rings 44 are provided for assisting in holding the vanes in position. The vanes have outer edges 34.2, and inner edges 32.2 spaced away from the central boss 40.2 to provide a clearance space to permit fluid flow between the said inner edges 32.2 and the boss 40.2. Axially directed openings are defined between the ends of adjacent vanes to permit axial flow out of the liquid retainers. A shroud of the type 42.2 is provided with this type of liquid-entrapping wheel 22.2.

The liquid-entrapping wheel 22.3 of FIGURE 1, has a central boss 40.3 and vanes 26.3 fast with it and extending outwardly therefrom. Recesses are defined between adjacent vanes 26.3 and the boss 40.3, and have openings directed axially to permit axial flow out of them. A shroud 42.2 is provided for this liquid-entrapping wheel 22.3.

The liquid-entrapping wheel 22.4 of FIGURE 1 has vanes 26.4 of curved section extending axially from a central wall or rib 46 (see FIGURE 2). This liquid-entrapping wheel has a shroud of the type 42.1.

FIGURE 3 shows diagrammatically an axial section through an embodiment 10.1 having a drum 14.1 which is co-axial with and rotatable relative to the carrier 12.1. In other respects this embodiment is the same as described with reference to FIGURES 1 and 2.

Figure 4:
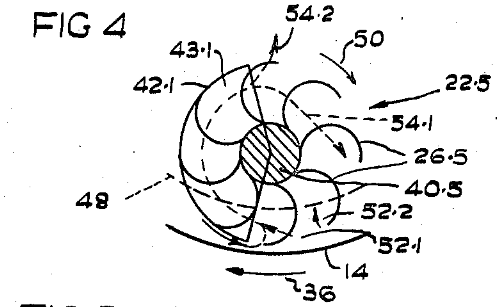
FIGURES 4 to 12 show cross-sections of various embodiments of vane wheels.

Referring to FIGURE 4, liquid-entrapping wheel 22.5 comprises curved vanes 26.5 extending from a central boss 40.5, and has a shroud of the type 42.1.

Figure 5:
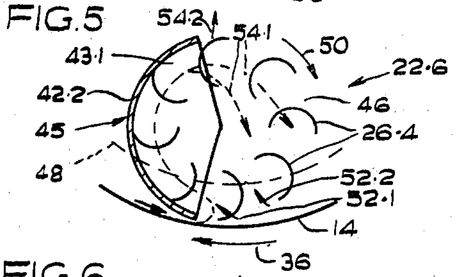
Figure 6:
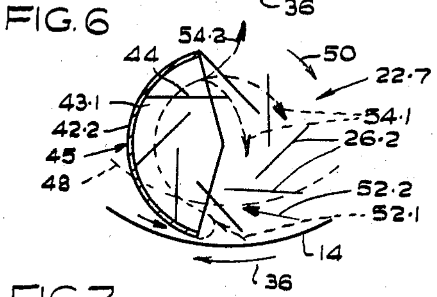
Figure 7:
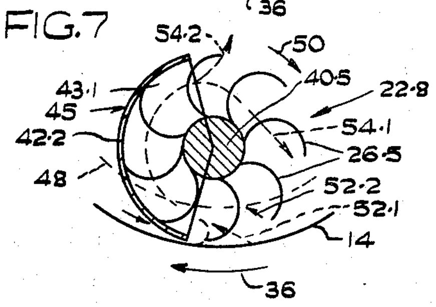
Figure 8:
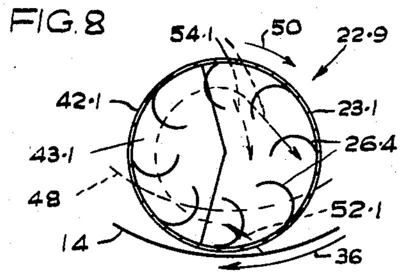
Figure 9:
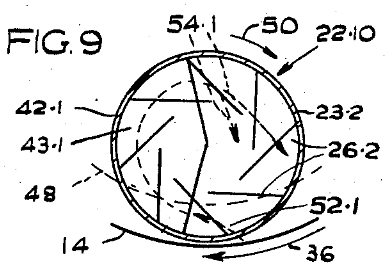
Figure 10:
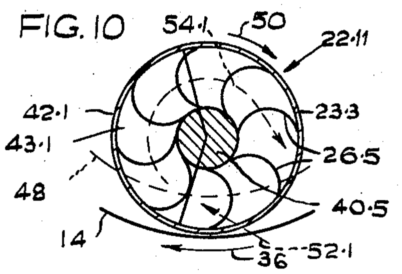
Figure 11:
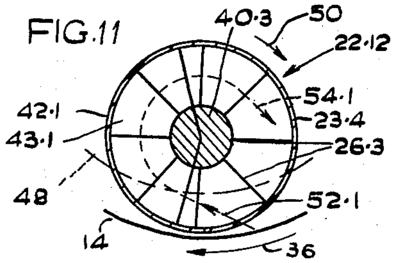
Figure 12:
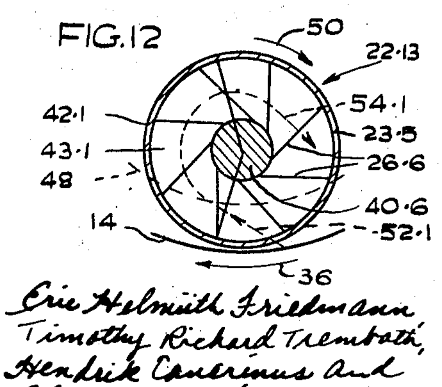

Referring to FIGURES 5 to 7, liquid-entrapping wheels 22.6, 22.7, 22.8 respectively comprise curved vanes 26.4, 26.2 and 26.5. Shrouds of the type 42.2 are provided with these wheels. The vanes 26.4 and 26.2 may be held by stiffening rings 44 or central walls or ribs 46 like those shown in FIGURES 1 and 2.

Referring to FIGURES 8 to 12, the various liquid-entrapping wheels 22.9, 22.10, 22.11, 22.12, 22.13 respectively comprise curved vanes 26.4, 26.2, 26.5, 26.3, and 26.6. On the outer periphery of the vanes a circumferentially closing-off wall 23.1, 23.2, 23.3, 23.4, 23.5 is respectively provided. Shrouds of the type 42.1 are provided with these liquid-entrapping wheels.

In operation, when the carrier 12 is rotated about its axis in the direction of arrow 36, and when the sun wheel 18 is stationary or rotates at a speed less than the speed of the carrier, the vanes will intersect a layer of fluid 48 on the inner periphery of the drum 14, the liquid-entrapping wheels 22 rotating in the direction shown by arrow 50. Liquid will enter the axially directed openings between the vanes and also radially directed openings, as indicated respectively by arrows 52.1 and 52.2 in FIGURES 4 to 12. When the planet wheel 24 rotates about its axis in the direction of arrow 50 relative to the carrier 12, the vanes will carry the liquid forward into the shroud 42.1 or 42.2, as the case may be. The liquid will therefore be entrapped between the vanes and the shroud on the leading side of the planet wheel axis relative to the direction of rotation of the carrier. As the vanes pass beyond the shroud, entrapped liquid is rejected axially or radially from the recesses between the vanes to prevent it being carried over on the trailing side of the vane wheel. This rejection is shown respectively by arrows 54.1, 54.2 in FIGURES 4 to 12. This results in the liquid entrapped on the leading side of the vane wheel forming an unbalanced mass. Due to rotation of the carrier about its axis, this unbalanced mass of entrapped liquid will be subjected to centrifugal force which will exercise a turning moment on the planet wheel 24 about its axis. This turning moment will be transmitted from the planet wheel onto the sun wheel 18 to provide a torque which may be used for driving a load.

As the sun wheel 18 speeds up, so the rate of rotation of the planet wheel about its axis relative to the carrier will slow down. When the sun wheel rotates at the same speed as the carrier, the planet wheel will be substantially stationary about its axis relative to the carrier. It may rotate only slowly to make up any leakage of fluid from between the vanes and shroud.

While the sun wheel 18 is stationary, or is rotating only slowly, the planet wheel 24 will be rotating at a fast rate in the direction of arrow 50 relative to the carrier. Under the action of centrifugal force directed away from the planet wheel axis, liquid entrapped between the vanes will be rejected beyond the confines of the shroud through the axially directed openings in the direction of arrows 54.1 and through radially directed openings in the direction of arrow 54.2. As rotation of the planet wheel about its axis relative to the carrier slows down, so the centrifugal force directed away from the planet wheel axis becomes less and less until rejection of fluid takes place under the action of centrifugal force resulting from rotation of the carrier about its axis. Such rejection will take place beyond the shroud in a direction away from the carrier axis and in an axial direction from between the vanes. In liquid-entrapping wheels 22.1, 22.2, 22.4, 22.6, 22.7, 22.9, 22.10, rejection of fluid can also take place over the inner lips of the vanes where there is a clearance space between the central shaft and the inner lips of the vanes.

Figure 13:
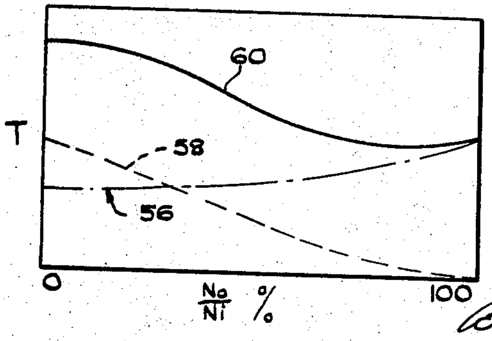
FIGURE 13 shows examples of torque to speed characteristic curves of a coupling in accordance with the invention.

The torque resulting from centrifugal force due to rotation of the carrier about its axis and acting on an unbalanced mass of entrapped liquid, may be represented by the characteristic 56 in FIGURE 13. By way of example, FIGURE 13 shows how the torque T may vary with output speed N*o* as a percentage of input speed N*i*.

Apart from the torque developed about the planet wheel axis as a result of centrifugal force, as above described, a further torque is also developed and which may be termed a "drag" or "dynamic" torque. When the vanes intersect the fluid layer 48 with a difference of speed, they will impinge against the liquid in the layer 48 and displace it about the planet wheel axis. This will exercise a drag on the vanes which is transmitted to the planet wheels and thence to the sun wheel. This torque, resulting from the drag, is available to drive a load connected to the output shaft. When the sun wheel and output shaft are stationary, or when the difference between input and output speed is relatively large, this dynamic torque is significant. As the output shaft speeds up, so this dynamic torque diminishes in value. Referring to FIGURE 13, this torque characteristic is represented by line 58.

The output torque available on the output shaft is the combination of these component torques, and may be represented by the characteristic curve 60 in FIGURE 13. It will be noted that at start-up and while there is a relatively large difference between input and output speeds, the drag torque is significant. However, as the output shaft speeds up and approaches input speed, i.e. as the speed of the vanes intersecting the fluid layer diminishes, so this drag torque diminishes. The torque resulting from centrifugal force acting on the unbalanced mass of entrapped liquid increases as the output shaft speeds up. When the output shaft is up to full speed, the torque is that resulting from centrifugal force acting on the unbalanced mass of liquid entrapped between the vanes of the vane wheel and the shroud.

Although the central bosses 40.1 and 40.2 are shown to be hollow for mounting on a stationary shaft, it will be understood that the bosses may be solid shafts which may be rotatably mounted in the carrier.

It is to be understood that the curves given in FIGURE 13 are intended to indicate the torque characteristics qualitatively and not quantitatively.

Referring to FIGURE 14, an adjustment means is shown for adjusting the shroud 42.1 or 42.2 arcuately in position about the planet wheel axis. In this case the liquid-entrapping wheel 22 is fixed to a sleeve 62 which is fast with planet wheel 24. Sleeve 62 is rotatably mounted on planet wheel shaft 66 which is fixed in the carrier 12. The shroud 42.1 or 42.2 is fixed to the shaft 66. Shaft 66 is arcuately displaceable about its axis in the carrier and can be locked in position to the carrier 12 by means of a locking screw 68. The shaft 66 is provided with flats 70 for gripping by a spanner for this adjustment.

The two side walls 43.1 and 43.2 of the shroud 42.1 may be connected by means of series of axial members 72 where a circumferential wall 45 is absent. The side wall 43.2 is fixed to the shaft 66 by means of the extension part 74.

We claim:

1. A fluid torque transmitter which includes a carrier adapted for receiving a rotary power input; at least one planet wheel mounted rotatably on the carrier; a driven wheel co-axial with the carrier and drivingly connected to the planet wheel and adapted for connection to a power output; liquid-entrapping means which includes a liquid-entrapping wheel having liquid retainers spaced circumferentially about the planet wheel axis and having axially directed openings defined between adjacent liquid retainers on at least one side of the liquid-entrapping wheel, the liquid-entrapping wheel being co-axial and fast with the planet wheel; a reservoir in the form of a drum around the liquid-entrapping means and co-axial with the carrier and adapted to contain hydraulic fluid, the liquid-entrapping means being arranged to entrap liquid from a peripheral layer of liquid set up in the drum due to the rotation of the carrier, and to displace such entrapped liquid inwardly towards the rotational axis of the carrier against the action of centrifugal force, the liquid-entrapping means including also shroud means fast with the carrier, the shroud means being adapted to seal off the axially directed openings between adjacent liquid retainers on that side of the liquid-entrapping wheel which leads the planet wheel axis relative to the direction of rotation of the carrier about its axis.

2. A fluid torque transmitter as claimed in claim 1, in which the liquid-entrapping wheel has radially directed openings out of the recesses defined between adjacent liquid retainers, and in which the shroud means is arranged to seal off such radially directed openings on the leading side of the liquid-entrapping wheel.

3. A fluid torque transmitter as claimed in claim 2, in which the shroud means is arcuately adjustable in position about the planet wheel axis.

4. A fluid torque transmitter as claimed in claim 1, in which the liquid retainers are in the form of curved vanes extending from a central boss.

5. A fluid torque transmitter as claimed in claim 1, in which the liquid retainers are in the form of straight vanes extending from a central boss.

6. A fluid torque transmitter according to claim 1, in which the liquid retainers are in the form of curved vanes circumferentially spaced apart.

7. A fluid torque transmitter as claimed in claim 1, in which the liquid retainers are in the form of straight vanes circumferentially spaced apart and disposed at an angle to radii from the planet wheel axis.

8. A fluid torque transmitter as claimed in claim 1, in which the shroud means is arcuately adjustable in position about the planet wheel axis.

9. A fluid torque transmitter as claimed in claim 1, in which the radially outward end of the shroud is positioned to become submerged by the peripheral liquid layer formed in the drum under the action of centrifugal force when the carrier rotates, and the radially inward end of the shroud extending inwardly to such an extent that it seals off the axially directed openings between adjacent liquid retainers nearest the carrier axis.

10. A fluid torque transmitter as claimed in claim 9, in which the shroud means is arcuately adjustable in position about the planet wheel axis.

References Cited

UNITED STATES PATENTS

| | | | |
|---|---|---|---|
| 1,507,369 | 9/1924 | Escott | 74—774 |
| 1,666,152 | 4/1928 | Strigl | 74—774 |
| 2,061,867 | 11/1936 | De Muynck | 74—752 |
| 2,293,547 | 8/1942 | Hobbs | 74—774 X |
| 2,468,964 | 5/1949 | Dunn et al. | 74—774 X |
| 3,261,233 | 7/1966 | Cancrinus | 74—752 X |
| 3,302,489 | 2/1967 | Cancrinus et al. | 74—752 |

FOREIGN PATENTS

| | | |
|---|---|---|
| 176,325 | 7/1922 | Great Britain. |

DONLEY J. STOCKING, *Primary Examiner.*

THOMAS C. PERRY, *Assistant Examiner.*

U.S. Cl. X.R.

74—774